US012187057B2

(12) United States Patent
Malatesta

(10) Patent No.: US 12,187,057 B2
(45) Date of Patent: Jan. 7, 2025

(54) MACHINE FOR THE INKJET DECORATION OF CERAMIC MANUFACTURED ARTICLES

(71) Applicant: PROBONO S.r.l., Modena (IT)

(72) Inventor: Alberto Malatesta, Modena (IT)

(73) Assignee: PROBONO S.r.l., Modena (IT)

( * ) Notice: Subject to any disclaimer, the term of this patent is extended or adjusted under 35 U.S.C. 154(b) by 136 days.

(21) Appl. No.: 17/926,872

(22) PCT Filed: May 27, 2021

(86) PCT No.: PCT/IB2021/054631

§ 371 (c)(1),
(2) Date: Nov. 21, 2022

(87) PCT Pub. No.: WO2021/240421

PCT Pub. Date: Dec. 2, 2021

(65) Prior Publication Data

US 2023/0202199 A1 Jun. 29, 2023

(30) Foreign Application Priority Data

May 29, 2020 (IT) ........................ 102020000012967

(51) Int. Cl.

| | |
|---|---|
| ***B41J 2/40*** | (2006.01) |
| ***B41J 2/145*** | (2006.01) |
| ***B41J 2/21*** | (2006.01) |
| ***B41J 3/407*** | (2006.01) |
| ***B41J 25/00*** | (2006.01) |

(Continued)

(52) U.S. Cl.
CPC ............... *B41J 3/407* (2013.01); *B41J 2/145* (2013.01); *B41J 2/21* (2013.01); *B41J 25/001* (2013.01); *B41J 29/02* (2013.01); *B41J 2002/14467* (2013.01); *B41J 2202/11* (2013.01)

(58) Field of Classification Search
CPC ..... B41J 3/407; B41J 2/145; B41J 2/21; B41J 25/001; B41J 25/316
See application file for complete search history.

(56) References Cited

U.S. PATENT DOCUMENTS

2015/0035897 A1* 2/2015 Monteiro .................. B41J 2/14 347/20

FOREIGN PATENT DOCUMENTS

| | | | | |
|---|---|---|---|---|
| CN | 103 722 886 A | 4/2014 | | |
| ES | 2586147 A1 * | 10/2016 | ............. | B41J 3/407 |
| ES | 2586147 B1 * | 7/2017 | ............. | B41J 3/407 |

(Continued)

*Primary Examiner* — Sharon Polk
(74) *Attorney, Agent, or Firm* — ASLAN LAW, P.C.

(57) ABSTRACT

A machine for inkjet decoration of ceramic manufactured articles, comprising a basic frame; one supporting surface having a surface to be decorated, where the supporting surface is movable along a direction; a plurality of printing heads each provided with a plurality of nozzles substantially aligned with each other along a relevant line of action and adapted to dispense ink along a relevant direction of dispensing, each of the heads defining a respective range of action on the surface to be decorated, wherein the heads comprise a fixed head(s) and a swivel head(s), and comprises a plurality of groups of heads, where each of the groups comprises a plurality of rows of heads arranged parallel to each other along a direction transverse to the direction, the heads of each of the rows being staggered with respect to the heads of the adjacent row belonging to the same group.

18 Claims, 8 Drawing Sheets

(51) Int. Cl.
*B41J 29/02* (2006.01)
*B41J 2/14* (2006.01)

(56) References Cited

FOREIGN PATENT DOCUMENTS

| | | | | | |
|---|---|---|---|---|---|
| ES | 2881532 | T3 | * | 11/2021 | ............ B41J 25/316 |
| JP | 2009 220452 | A | | 10/2009 | |
| WO | WO 2011095865 | A2 | | 8/2011 | |

* cited by examiner

MACHINE FOR THE INKJET DECORATION OF CERAMIC MANUFACTURED ARTICLES

CROSS-REFERENCE TO RELATED APPLICATIONS

This application claims priority to IT patent application No. 102020000012967 filed on May 29, 2020, and this application claims priority to and is a 371 of international PCT Application No. PCT/IB2021/054631 filed on May 27, 2021, the entire contents of which are hereby incorporated by reference.

TECHNICAL FIELD

The present invention relates to a machine for the inkjet decoration of ceramic manufactured articles.

BACKGROUND ART

The present invention finds special application in the decoration of visible surfaces having reliefs, recesses, depths or areas differentially inclined to each other.

Inkjet printing devices have long been used in the ceramics industry. These devices comprise one or more printing heads consisting of a plurality of nozzles, placed along at least one line, typically a straight line, which emit controlled jets of micro-droplets of ink, taken from a tank or a cartridge.

The printing head is controlled by an electronic processor that gives a sequence of printing controls to the various nozzles, depending on the image to be obtained and of the relevant position between the head and the surface to be printed, activating the nozzles or leaving them inactive.

Generally, in the event of the manufactured article to be decorated having reliefs, recesses or portions of surfaces differently inclined to each other, these are decorated at different times and with different devices to each other.

As can be easily guessed, this significantly complicates the decoration of this type of manufactured articles compared to the manufactured articles that have a flat surface to be decorated.

In order to overcome these drawbacks, decoration devices have been devised provided with adjustable heads, that is, with a variable inclination in order to adapt to the particular conformation of the manufactured article to be decorated and thus allow the complete decoration of the manufactured article itself in a single solution.

These devices do, however, also have some drawbacks, since they are designed to decorate “special” manufactured articles, i.e. provided with reliefs, recesses or surfaces differently inclined to each other, while they are not suitable or are characterized by a significantly lower production output in the case of “standard” manufactured articles, or the surface of which to be decorated is flat.

As can be easily understood, this drawback makes the use of these machines inflexible and, therefore, expensive if compared to their production capacity.

DESCRIPTION OF THE INVENTION

The main aim of the present invention is to devise a machine for the inkjet decoration of ceramic manufactured articles that allows decorating both manufactured articles having reliefs, recesses and/or surfaces differently inclined to each other and manufactured articles having a surface to be decorated of the flat type.

Within this aim, one object of the present invention is therefore to devise a machine that is of more flexible use than the machines of known type.

Another object of the present invention is to manufacture a machine that has higher production efficiency than the machines of known type.

Another aim of the present invention is to devise a machine for the inkjet decoration of ceramic manufactured articles that allows overcoming the aforementioned drawbacks of the prior art in the context of a simple, rational, easy, effective to use and affordable solution.

The aforementioned objects are achieved by the present machine for the inkjet decoration of ceramic manufactured articles according to claim 1.

BRIEF DESCRIPTION OF THE DRAWINGS

Other characteristics and advantages of the present invention will become more apparent from the description of a preferred, but not exclusive, embodiment of a machine for the inkjet decoration of ceramic manufactured articles, illustrated by way of an indicative, yet non-limiting example, in the accompanying tables of drawings wherein.

EMBODIMENTS OF THE INVENTION

Figure 1:
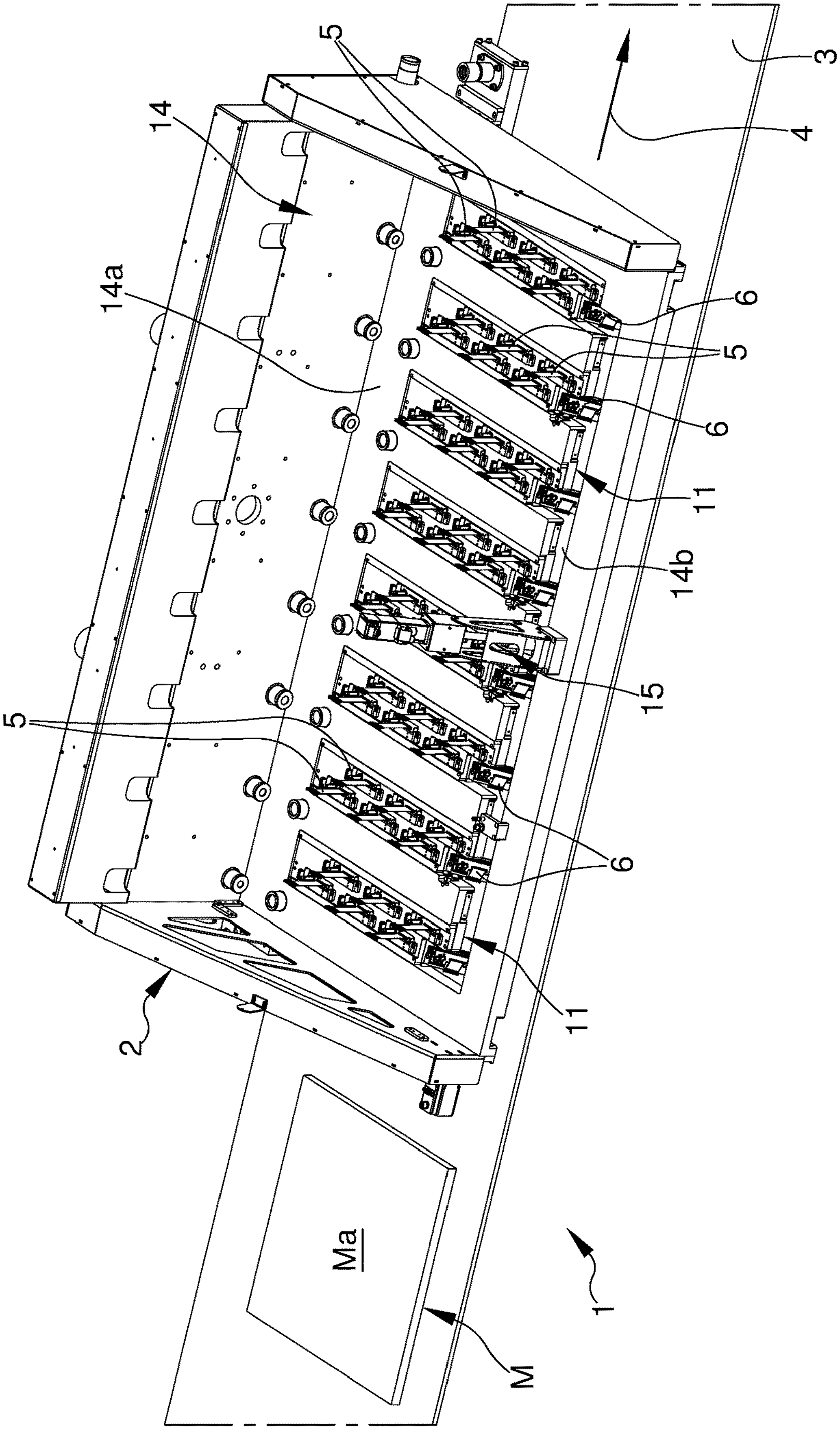
FIG. 1 is an axonometric view of a machine according to the invention, in a first embodiment.
Figure 2:
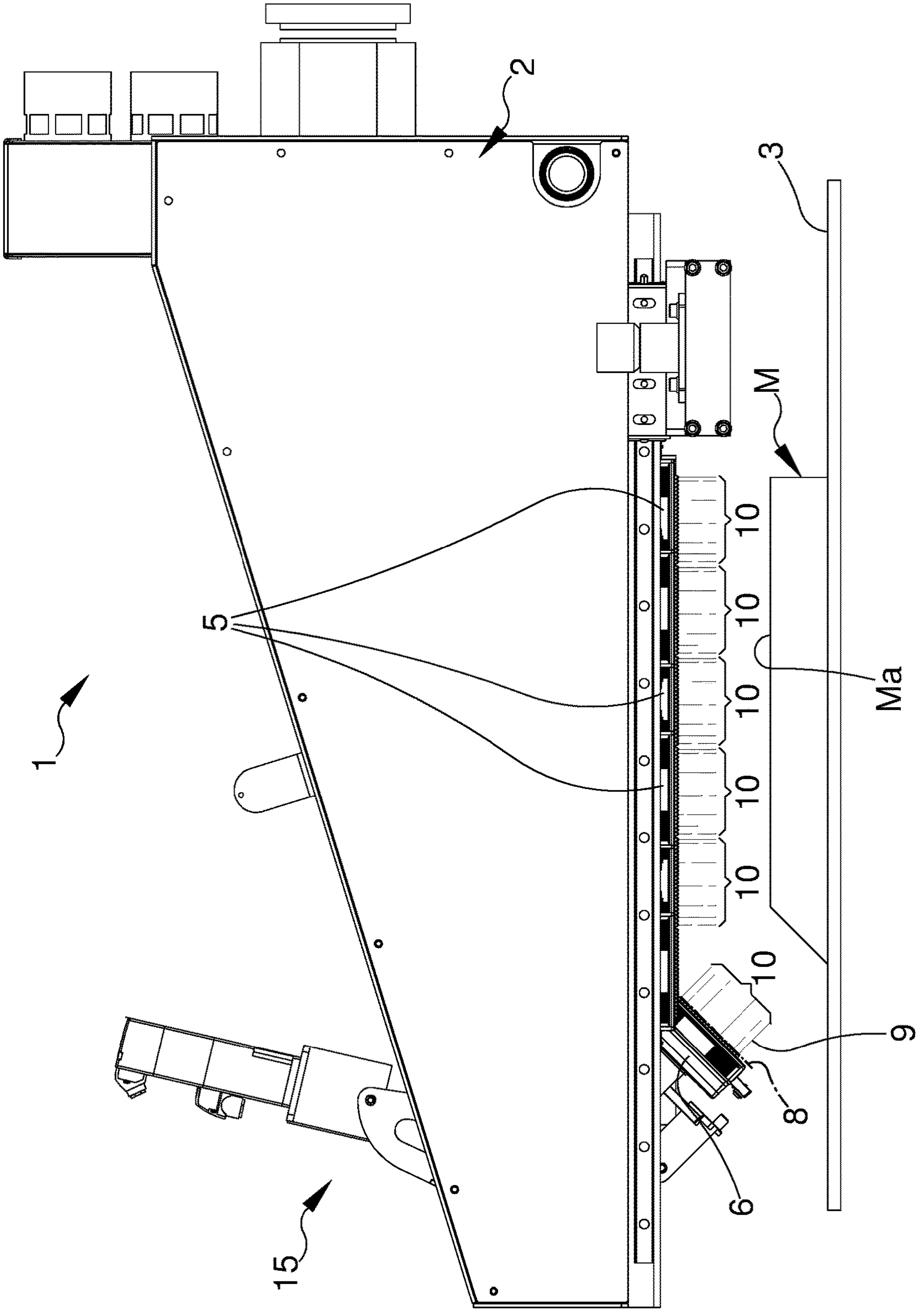
FIG. 2 is a side elevation view of the machine in FIG. 1.
Figure 3:
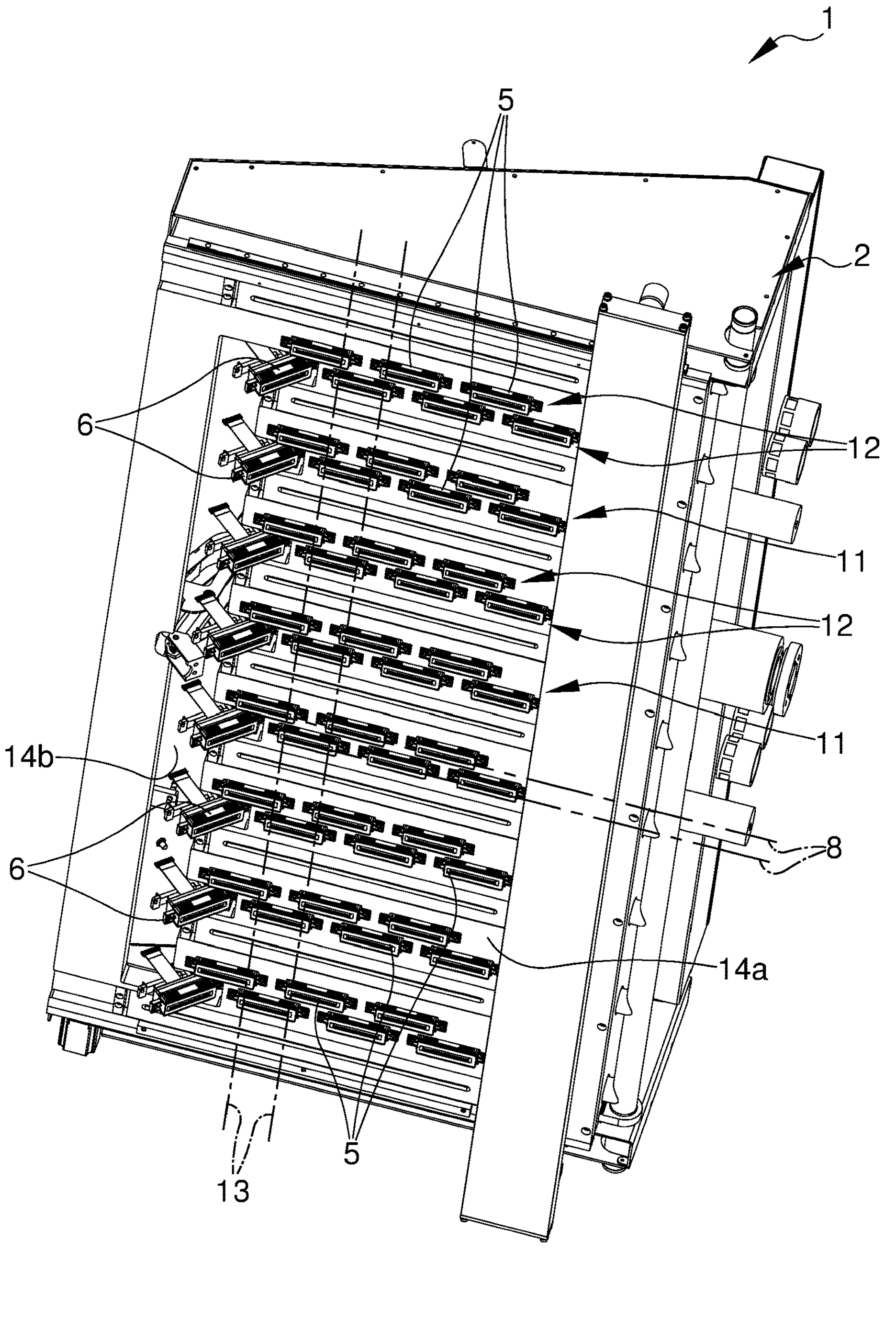
FIG. 3 is an axonometric view from below of the machine in FIG. 1.
Figure 4:
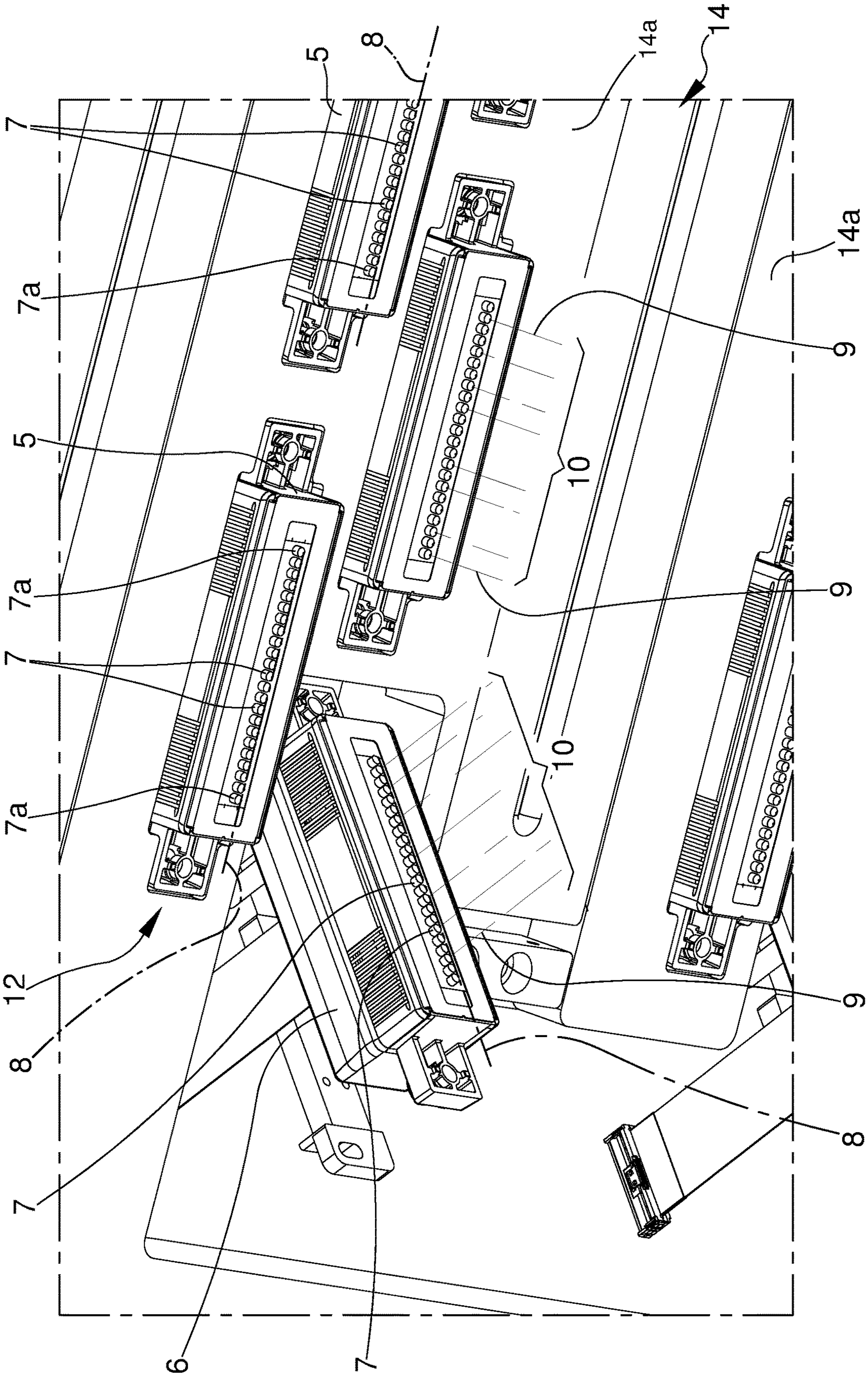
FIG. 4 is a magnifying view of a part of the machine shown in FIG. 3.
Figure 5:
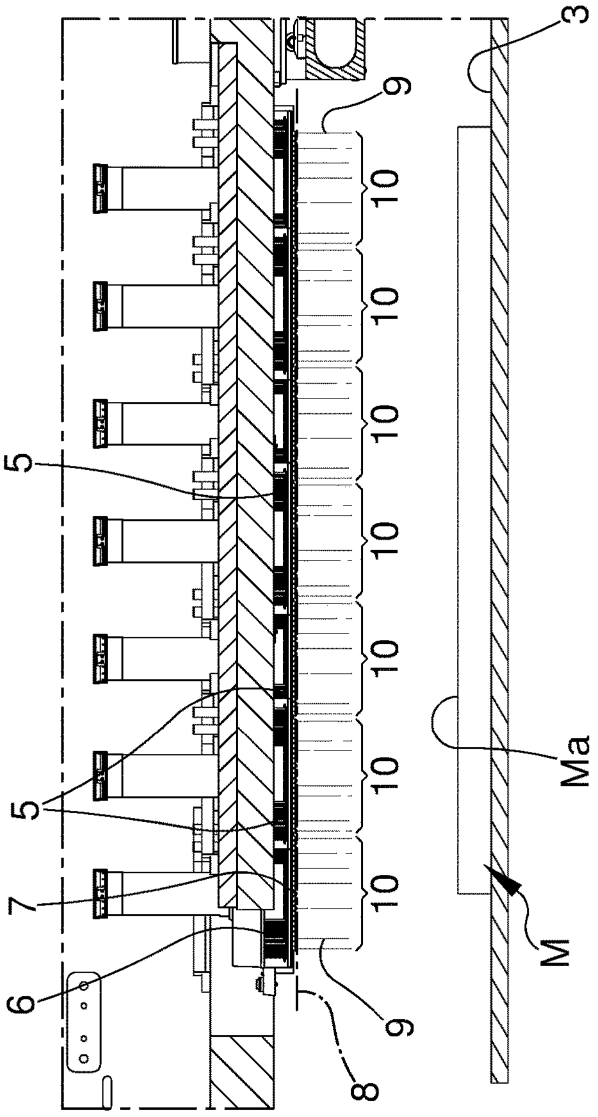
FIG. 5 is a cross-sectional view of the machine in FIG. 1 with the swivel heads in neutral configuration.
Figure 6:
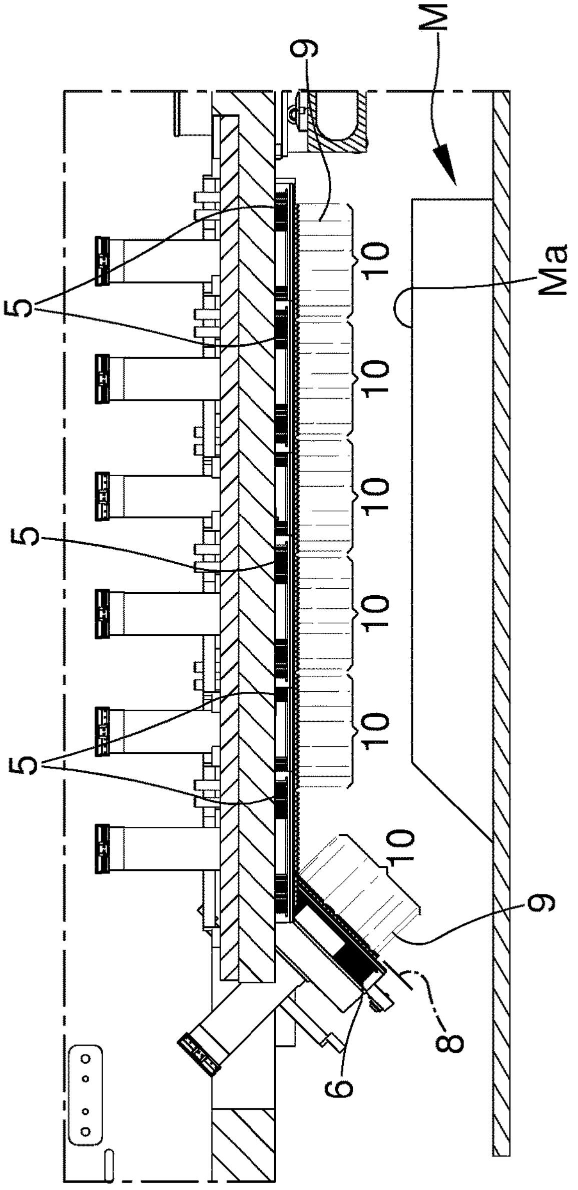
FIG. 6 is a cross-sectional view of the machine in FIG. 1 with the swivel heads in special configuration.

With particular reference to these figures, reference numeral 1 globally indicates a machine for the inkjet decoration of ceramic manufactured articles.

The machine 1 comprises a basic frame 2, at least one supporting surface 3 of a ceramic manufactured article M having a surface to be decorated Ma, where the supporting surface 3 is associated with the basic frame 2 and is movable along a direction of forward movement 4.

More particularly, the basic frame 2 is only partly shown in the figures and is intended to be arranged to rest on a supporting surface, such as the ground.

The machine 1 comprises a plurality of printing heads 5,6 each provided with a plurality of nozzles 7 substantially aligned with each other along a relevant line of action 8 and adapted to dispense ink along a relevant direction of dispensing 9, each of said heads defining a respective range of action 10 on the surface to be decorated.

The direction of dispensing 9 is arranged transversely, and in particular perpendicularly, to the relevant line of action 8.

The nozzles 7 of each head 5,6 can be used either in whole or in part depending on the extent and shape of the surface to be decorated. The relevant range of action 10 may therefore differ from head to head.

The heads 5,6 comprise at least one fixed head 5, the line of action 8 of which is fixed and substantially parallel to the supporting surface 3, and at least one swivel head 6 with variable inclination between at least one neutral configuration, wherein the respective line of action 8 is substantially parallel to the supporting surface 3, and at least one special configuration, wherein the relevant line of action 8 is inclined with respect to the supporting surface 3.

More in detail, the machine 1 comprises a plurality of fixed heads 5 and a plurality of swivel heads 6.

Preferably, the swivel heads 6 are continuously movable, so that a wide variety of possible angles can be achieved.

It cannot however be ruled out that the swivel heads 6 can be moved discretely, i.e., at predefined angular intervals.

Suitably, the swivel heads 6 are movable along an angular range ranging from 0° to 90°.

According to the invention, the machine 1 comprises a plurality of groups 11 of heads 5,6, where each of such groups 11 comprises a plurality of rows 12 of heads 5,6 arranged parallel to each other along a direction transverse to the direction of forward movement 4.

The heads 5,6 of each row 12 are staggered with respect to the heads 5,6 of the adjacent row 12 belonging to the same group 11 so that their ranges of action 10 involve the entire width of the surface to be decorated Ma, transversely to the direction of forward movement 4, when the swivel heads 6 are in a neutral configuration, while the ranges of action of the heads 5,6 only partly cover the width of the surface to be decorated Ma, transversely to the direction of forward movement 4, when the said swivel heads 6 are arranged in a special configuration.

Each head 5,6 has two end nozzles 7*a* arranged along the relevant line of action 8.

Advantageously, when the swivel heads 6 are in neutral configuration, the lines of action 8 of the heads 5, 6 belonging to each of the rows 12 are substantially aligned to each other and the distance between the end nozzles 7*a* of the heads 5,6 of each of the rows 12 and the end nozzles 7*a* of the consecutive heads 5,6, belonging to the adjacent row 12 of the same group 11, is substantially equal to the distance between two nozzles 7 belonging to the same head 5,6.

In this way, the end of the range of action 10 of a head 5,6 corresponds to the beginning of the range of action 10 of the next head 5,6 arranged in the adjacent row of the same group 11 of heads 5,6.

Preferably, when the swivel heads 6 are in neutral configuration, the nozzles 7 belonging to different rows 12 are aligned with each other, by alternating rows 12, along a direction of alignment 13 which is transverse to the relevant lines of action 8.

Conveniently, the direction of alignment 13 is substantially parallel to the direction of forward movement 4.

In more detail, each of the groups 11 of heads 5,6 is adapted to dispense a corresponding color of ink. In the embodiments shown in the figures, each group 11 comprises two rows 12 of heads 5,6.

More particularly, the machine 1 comprises at least one supporting plate 14 of the heads 5,6 associated with the basic frame 2 and positioned above the supporting surface 3. The supporting plate 14 comprises at least one fixed portion 14*a* supporting the fixed heads 5 and at least one movable portion 14*b* supporting the swivel heads 6 and movable in rotation around a relevant axis with respect to the basic frame 2.

Advantageously, the machine 1 comprises actuation means 15 of the displacement of the movable portion 14*b*.

More particularly, the actuation means 15 comprise at least one actuation element, of the type of a fluid-operated cylinder, associated with the movable portion 14*b*. In the embodiment shown in the figures, the fluid-operated cylinder 15 has a body associated with the basic frame 2 and a piston, movable in a sliding manner with respect to the body, associated with the movable portion 14*b*.

In an embodiment, not shown in the figures, the swivel heads 6 are movable independently to each other between the neutral configuration and the special configuration. In other words, each swivel head 6 can be moved independently of the other swivel heads 6, in such a way that each of the swivel heads 6 can be arranged in the most suitable position depending on the conformation of the manufactured article M to be decorated.

In the embodiment shown in FIGS. 1 to 6, on the other end, at least some of the swivel heads 6 are movable locked together between the neutral configuration and the special configuration.

More particularly, in the embodiment shown in the figures, the swivel heads 6 correspond to one of the end heads of at least one of the rows 12 of each of the groups 11 of heads 5,6.

Conveniently, the movable portion 14*b* of the supporting plate 14 supports the swivel heads 6 locked to each other and the actuation means 15 comprise a single actuation element adapted to move the movable portion 14*b*.

Figure 7:
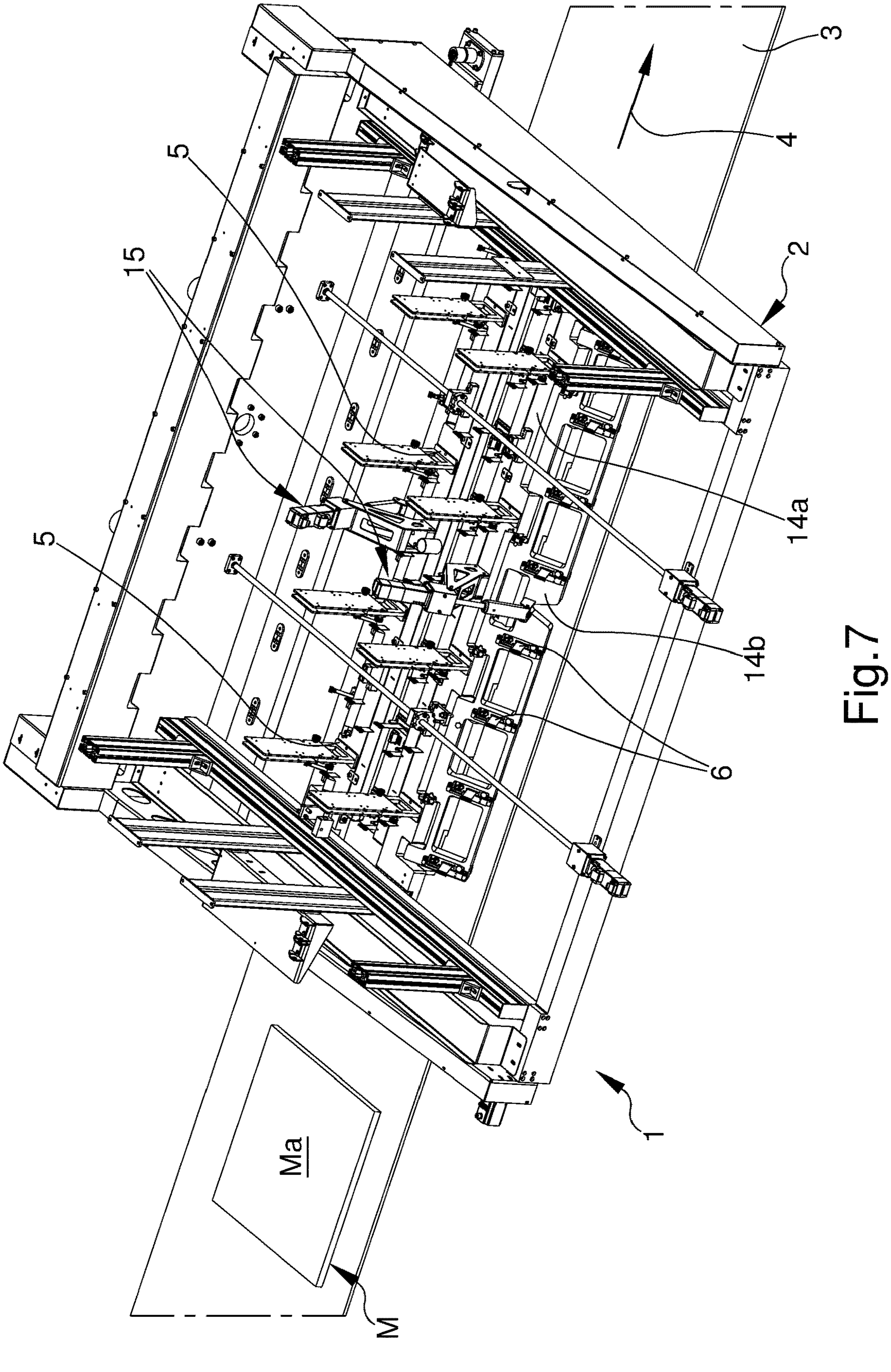
FIG. 7 is an axonometric view of a machine according to the invention, in a second embodiment.
Figure 8:
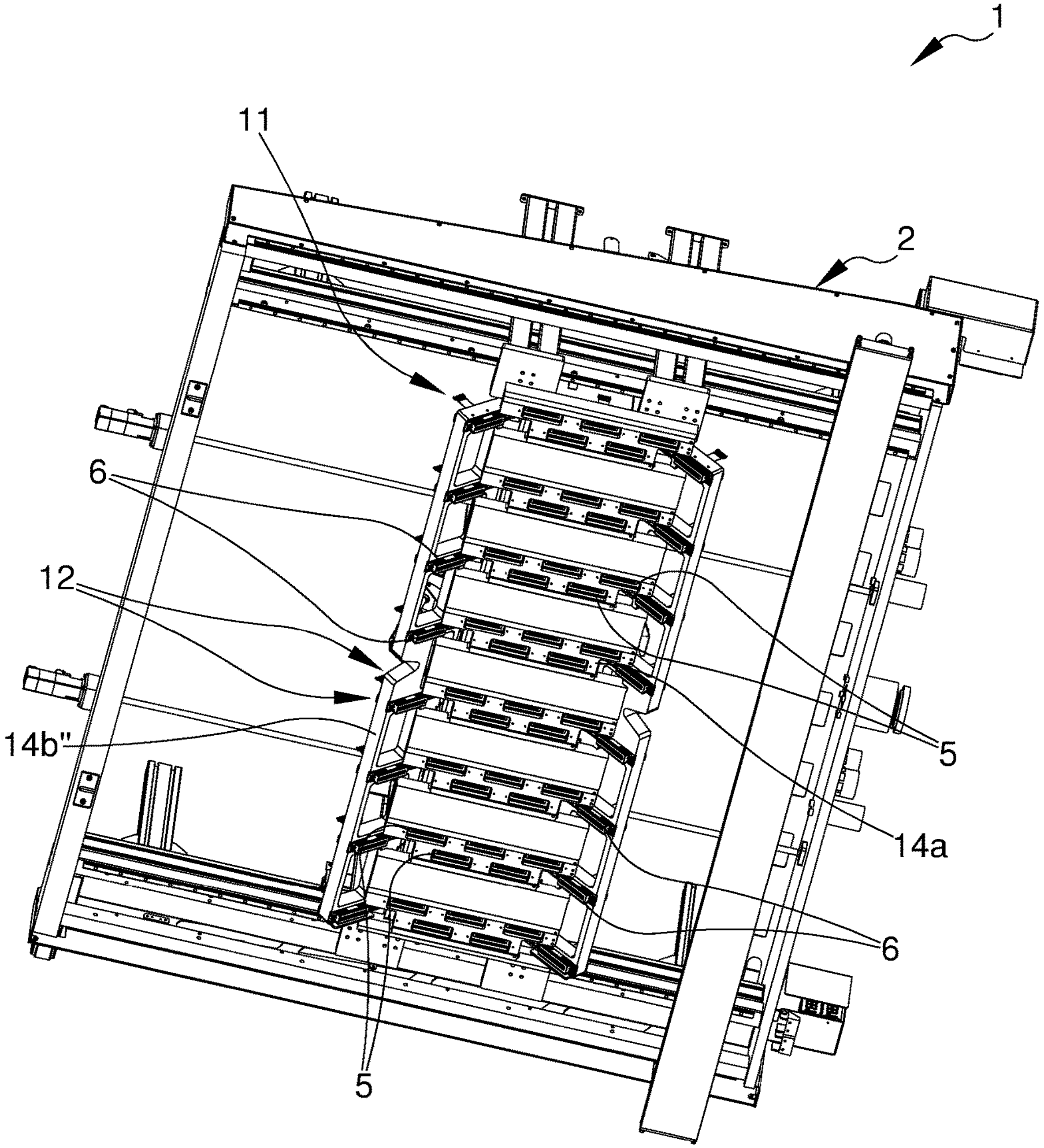
FIG. 8 is an axonometric view from below of the machine in FIG. 7.
Figure 9:
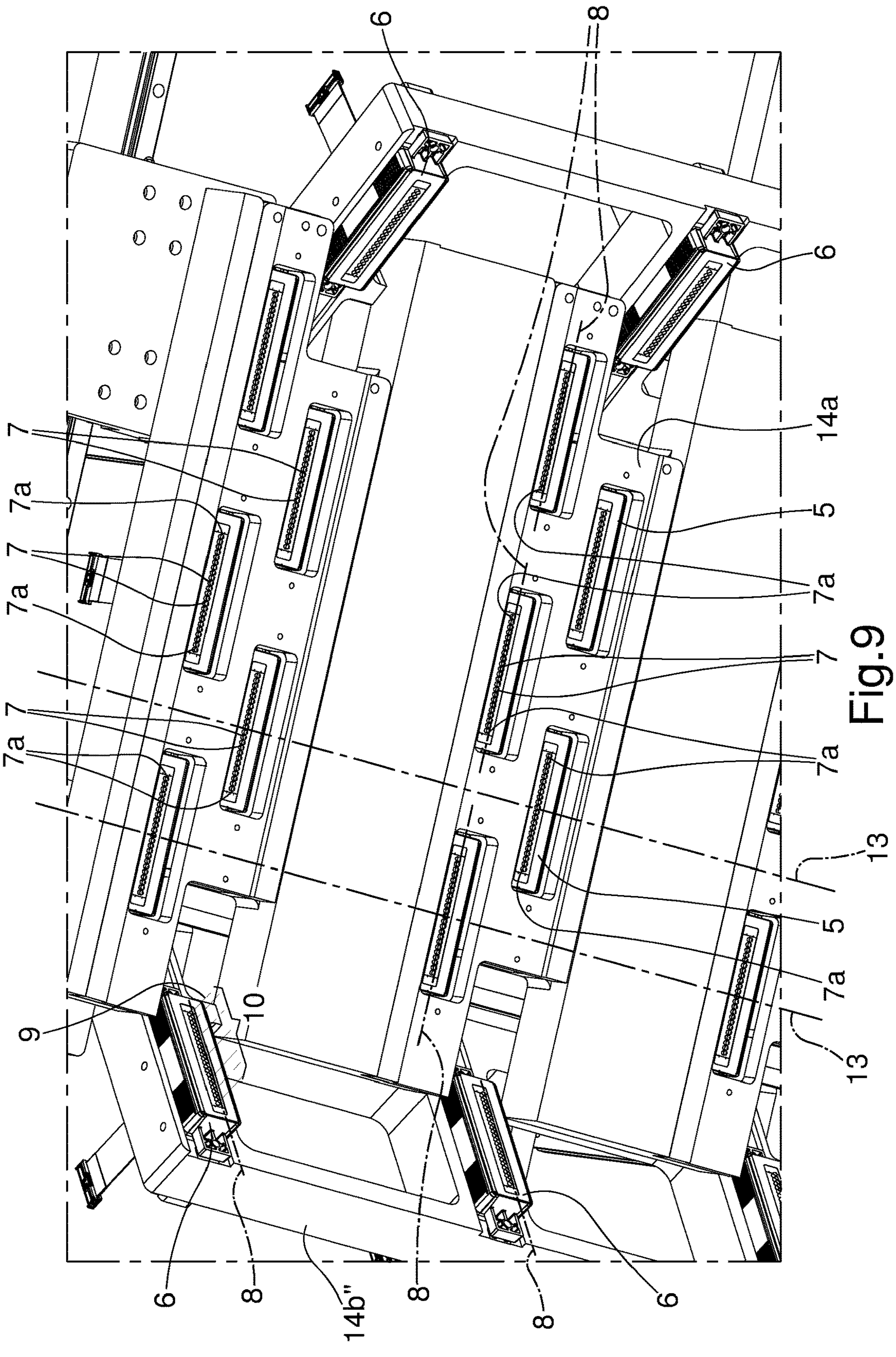
FIG. 9 is a magnifying view of a part of the machine shown in FIG. 8.

In the second embodiment shown in FIGS. 7 to 9, the movable portion 14*b* comprises at least a first movable portion 14*b*', supporting the swivel heads 6 locked to each other which are arranged at one end of at least one of the rows 12 of each of the groups 11 of heads 5,6, and at least a second movable portion 14*b*", supporting the swivel heads 6 locked to each other which are arranged at the other end of the same row 12 of each of the groups 11 of heads 5,6.

Preferably, the first movable portion 14*b*' and the second movable portion 14*b*" are movable independently of each other.

In this embodiment, the actuation means 15 comprise two actuation elements, arranged on opposite sides of the supporting plate 14 and each adapted to move a relevant movable portion 14*b*', 14*b*".

In more detail, the actuation elements 15 are arranged on opposite sides with respect to a median plane of the supporting plate 14 passing through the direction of forward movement 4.

The operation of the present invention is as follows.

Depending on the manufactured article M to be decorated, the swivel heads 6 are moved to the special configuration, in such a way as to arrange the relevant lines of action 8 in a manner that is almost parallel to the average inclination line of the transverse profile of the portion of the surface to be decorated Ma subjected to the range of action 10 of the head itself. In particular, said average inclination is identified by the chord joining the two end points of the profile of the concerned portion of the surface to be decorated Ma.

One example may be the decoration of the so-called "skirting boards", which have a main substantially flat portion and a portion inclined with respect to such main portion.

In the event of the manufactured article M having both lateral edges, opposite each other, and inclined with respect to the upper surface to be decorated Ma, it is possible to use the machine 1 shown in FIGS. 7 to 9 and move the two movable portions 14*b*' and 14*b*" independently of each other so as to move the relevant swivel heads 6 to the special configuration most suitable for the decoration thereof.

If, on the other hand, "standard" type manufactured articles M are also fed onto the conveying surface, i.e., the surface of which to be decorated Ma is substantially flat and devoid of reliefs, recesses or differently inclined portions, the swivel heads 6 are brought back, or kept, in neutral position, so that their range of actions 10 are able to cover the entire width of the surface to be decorated Ma.

It has in practice been ascertained that the described invention achieves the intended objects and, in particular, the fact has been underlined that the machine to which the present invention relates, allows adapting in a flexible manner to the production requirements, thus optimizing the decorative process both in case of "special" manufactured articles, i.e. provided with reliefs, recesses or differently inclined surfaces, and of "standard" manufactured articles, i.e. the surface of which to be decorated is flat.

This is due to the special arrangement of the heads, both swivel and fixed, which allows the largest possible printing area to be covered when the swivel heads are in the neutral position.

The invention claimed is:

1. A machine for inkjet decoration of ceramic manufactured articles, the machine comprising:

a basic frame;

at least one supporting surface of a ceramic manufactured article having a surface to be decorated, where said supporting surface is associated with said basic frame and is movable along a direction of forward movement;

a plurality of printing heads each provided with a plurality of nozzles substantially aligned with each other along a relevant line of action and adapted to dispense ink along a relevant direction of dispensing, each of said heads defining a respective range of action on the surface to be decorated, wherein said heads comprise at least one fixed head, the line of action of which is fixed and substantially parallel to said supporting surface, and at least one swivel head with variable inclination between at least one neutral configuration, wherein the relevant line of action is substantially parallel to said supporting surface, and at least one special configuration, wherein the relevant line of action is inclined with respect to said supporting surface; and a plurality of groups of said heads, where each of said groups comprises a plurality of rows of said heads arranged parallel to each other along a direction transverse to said direction of forward movement, the heads of each of said rows being staggered with respect to the heads of the adjacent row belonging to the same group so that their ranges of action involve the whole width of the surface to be decorated, transversely to said direction of forward movement, when said swivel heads are in neutral configuration, the ranges of action of said heads covering only partly the width of the surface to be decorated with said swivel heads in special configuration, wherein each of said heads has two end nozzles arranged along the relevant line of action and, when said swivel heads are in neutral configuration, the lines of action of the heads belonging to each of said rows are substantially aligned to each other and the distance between the end nozzles of the heads of each of said rows and the end nozzles of the consecutive beads, belonging to the adjacent row of the same group, is substantially equal to the distance between two of said nozzles belonging to the same head and consecutive to each other, and wherein each of said groups of heads is adapted to dispense a corresponding color of ink.

2. The machine according to claim 1, wherein, when said swivel heads are in neutral configuration, the nozzles belonging to different rows, are aligned with each other, in alternating rows, along a direction of alignment transverse to the relevant lines of action.

3. The machine according to claim 2, wherein said direction of alignment is substantially parallel to said direction of forward movement.

4. The machine according to claim 1, further comprising: at least one supporting plate of said heads associated with said basic frame and positioned above said supporting surface and by the fact that said supporting plate comprises at least one fixed portion supporting at least one fixed head and at least one movable portion supporting said at least one swivel head and movable in rotation around a relevant axis with respect to said basic frame.

5. The machine according to claim 4, further comprising: actuation means of the displacement of said at least one movable portion.

6. The machine according to claim 1, further comprising: a plurality of said swivel heads.

7. The machine according to claim 6, wherein said swivel heads are movable independently to each other between said neutral configuration and said special configuration.

8. The machine according to claim 6, wherein at least some of said swivel heads are movable locked together between said neutral configuration and said special configuration.

9. The machine according to claim 8, wherein said swivel heads correspond to an end head of at least one of the rows of each of said groups of heads.

10. The machine according to claim 9, wherein said movable portion supports said swivel heads locked together.

11. The machine according to claim 8, wherein said swivel heads correspond to both end heads of at least one of the rows of each of said groups of heads.

12. The machine according to claim 11, wherein said movable portion comprises at least a first movable portion, supporting the swivel heads locked together which are arranged at one end of at least one of the rows of each of said groups of heads, and at least a second movable portion, supporting the swivel heads locked together which are arranged at the other end of said at least one of the rows of each of said groups of heads.

13. The machine according to claim 12, wherein said first and second movable portion are movable independently of each other.

14. The machine according to claim 13, further comprising: actuation means of the displacement of said at least one movable portion.

15. The machine according to claim 8, wherein said movable portion supports said swivel heads locked together.

16. The machine according to claim 1, wherein, when said swivel heads are in neutral configuration, the nozzles belonging to different rows, are aligned with each other, in alternating rows, along a direction of alignment transverse to the relevant lines of action.

17. The machine according to claim 1, wherein said direction of alignment is substantially parallel to said direction of forward movement.

18. The machine according to claim 1, wherein each of said groups of heads is adapted to dispense a corresponding color of ink.

* * * * *